(12) United States Patent
Nally et al.

(10) Patent No.: US 6,298,478 B1
(45) Date of Patent: Oct. 2, 2001

(54) TECHNIQUE FOR MANAGING ENTERPRISE JAVABEANS (™) WHICH ARE THE TARGET OF MULTIPLE CONCURRENT AND/OR NESTED TRANSACTIONS

(75) Inventors: Martin P. Nally, Raleigh; Lawrence Scott Rich; Timo J. Salo, both of Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,986

(22) Filed: Dec. 31, 1998

(51) Int. Cl.$^7$ .................................................. G06F 9/445
(52) U.S. Cl. ........................ 717/6; 717/2; 717/3; 717/11
(58) Field of Search ................................. 717/6, 2, 3, 11

(56) References Cited

U.S. PATENT DOCUMENTS

| | | | |
|---|---|---|---|
| 6,098,093 | * | 8/2000 | Bayeh et al. ......................... 709/203 |
| 6,115,736 | * | 9/2000 | Devarakonda et al. ............. 709/202 |

OTHER PUBLICATIONS

Matena et al, "Sun Microsystems Enterprise JavaBeans™", Sun Microsystems Inc., pp. 1–181, Mar. 1998.*
Dave Johnson, "Charles Schwab and IBM's BeanExtender", IBM Software Solution Division, pp. 1–7, Mar. 1998.*
Otto Fox, "Using BeanExtender's Dipping Technique", Component Technology, IBM Software Solution Division , pp. 1–8, Mar. 1998.*
Mike Day, "Contrasting JavaBeans and Enterprise Java-Beans", http://www–4.ibm.com/software/developer/library/javabeans–enterprise–javabeans.html , pp. 1–3, Apr. 1998.*
Natarajan et al., "Merging component models and architectural styles ", ACM, pp. 109–111, Nov. 1998.*
Goldschmidt et al., "Exploiting Enterprise JavaBeans in the NIIIP virtural enterprise ", IEEE, pp. 124–135, Nov. 1998.*
Schmuck et al, "Experience with transactions in QuickSilver", ACM, pp. 239–253, Oct. 1991.*
Michael Shoffner, "Write a session EJB", http://www.java-world.com/javaworld/jw–07–1998/jw–07–step_p.html, pp. 1–13.*

* cited by examiner

*Primary Examiner*—Kakali Chaki
*Assistant Examiner*—Ted T. Vo
(74) *Attorney, Agent, or Firm*—Gregory M. Doudnikoff; Marcia L. Doubet

(57) ABSTRACT

A technique for providing a transaction management subsystem for an enterprise computing environment in which multiple concurrent and/or nested transactions may access the same Enterprise JavaBeans (EJBs) simultaneously. The transaction management subsystem provides a view for each transaction which includes an independent version of an EJB's business logic and its instance data. When an application or application user has made modifications to an EJB version and requests to commit the modifications, a determination is first made as to whether committing the modifications will result in an unacceptable data conflict with other versions of the same EJB. If no unacceptable data conflict will occur, and after resolution of those conflicts that can be resolved, the modifications are committed. The management subsystem also supports nested transactions, where each subtransaction may have an independent view of an EJB. Subtransactions may commit or roll back independently. Changes made by a transaction are represented using a tree structure that is internally managed by the application.

9 Claims, 13 Drawing Sheets

TECHNIQUE FOR MANAGING ENTERPRISE JAVABEANS (™) WHICH ARE THE TARGET OF MULTIPLE CONCURRENT AND/OR NESTED TRANSACTIONS

RELATED INVENTIONS

This application is related to U.S. patent application Ser. No. 09/224,535 entitled "Technique for Managing Associations Between Enterprise JavaBeans™ which are the Target of Multiple Concurrent and/or Nested Transactions", filed concurrently herewith on Dec. 31, 1998, and U.S. patent application Ser. No. 09/001,980 entitled "Technique for Managing Objects which are the Target of Multiple Transactions in a Client/Server Environment", filed Dec. 31, 1997.

BACKGROUND OF THE INVENTION

1. Field of the Invention

The present invention relates to the field of computer programming, and more particularly to a technique for managing Enterprise JavaBeans™ which are being utilized by concurrent and/or nested transactions. This technique enables maintaining the integrity of the Enterprise JavaBeans™.

2. Description of the Related Art

"JavaBeans" is the name of a component architecture for use with the Java programming language. ("JavaBeans" and "Java" are trademarks of Sun Microsystems, Inc.) A JavaBean is the Java term for a "component", where a component is a reusable building block of application logic that a programmer can combine with other components to form an application program. "Enterprise JavaBeans" is a server component architecture which extends the JavaBeans architecture to the enterprise. "Enterprise" in this sense refers to an organization that uses computers in a networking environment, typically on a very large scale.

A Java programmer creates a Java application program by assembling components that provide the desired functionality for his application. A JavaBean may contain code for a relatively simple function such as displaying a button on a graphical user interface ("GUI"), but it may also contain quite complex code. An Enterprise JavaBean, or "EJB", is similar to a JavaBean, with several notable exceptions. JavaBeans are intended to execute locally, within the Java Virtual Machine ("JVM") on which a Java application is running. EJBs, on the other hand, are intended to execute on a server machine in a network, where they are remotely invoked by messages sent from a client machine's JVM. JavaBeans may provide code for visual objects, such as the GUI button discussed above; EJBs are always non-visual.

For an EJB, the executable business logic is stored within the entity bean. An EJB's business methods are invoked by sending a message to the EJB's wrapper, where a "wrapper" is the Java term for functionality required to adapt an EJB to its container, and a "container" is the Java terminology for the run-time environment in which an EJB (including the entity bean) is executed. The business method invocations are forwarded to the entity bean by the wrapper for execution. Thus, the wrapper is not always able to detect when an EJB has been modified. This differs from the approach of the related application filed Dec. 31, 1997, titled "Technique for Managing Objects which are the Target of Multiple Transactions in a Client/Server Environment", which is hereinafter referred to as "the related application", where the executable business logic is stored within the wrapper (referred to as a "shell" in the related application).

Both JavaBeans and EJBs differ from "pure" objects in object-oriented programming in that they have a required external interface. This interface is called the "properties" interface. Using this external interface, a development tool can interrogate the JavaBean or EJB, to determine what its component does and how its function is to be invoked by other components. The properties interface also enables developers to customize the behavior of components without having access to the source code. As a simple example, when the component contains code for displaying a button on a GUI, the developer may use a component property to specify the text that should be displayed on the button face.

In large-scale enterprise computing environments, a single server application may serve multiple concurrent client applications, each accessing an overlapping set of EJBs, while other server applications are also accessing the EJBs. See FIG. 1, which depicts a simple example of this situation. A collection of EJBs is stored in a data store, such as database 110. These stored EJBs may be accessed concurrently by one or more server application programs. Two server applications 120, 122 are shown in FIG. 1, but many more than two applications may share access to a data store, as is known in the art. (The collection of EJBs being accessed by the applications may reside on multiple data stores, although only one data store 110 has been shown in FIG. 1.) Each server application may have one or more clients that are executing the application at a given time. Server application 120 is shown in FIG. 1 as having two clients 130, 135, and server application 122 is shown as having three clients 140, 145, 150.

Many enterprise applications that reflect complex business processes require that users have the ability to navigate freely between different elements of the user interface. For example, the user may wish to have multiple windows for one application open on the display at the same time. Users of such applications have come to expect that they can switch from processing information in one window to processing information in a different window without having to take special precautions to ensure consistency of the data between the different windows. In particular, if the user makes changes to data values in one window, he does not expect to have to take steps to permanently store the changes in a data store before subsequently-opened windows for the same application can recognize the changed data.

The related application defines a technique for solving this problem for objects using a transactional approach, where the tasks a user (or application program) performs are organized into transactions. Using commonly-known industry terms, a transaction represents a logical group of changes to one or more objects that will be performed in an atomic manner (that is, either all operations within the transaction are performed, or none of them are performed). Using the transactional approach defined in this related application, all changes that the user wants to make to an object within the scope of a transaction are made first to an internal copy (called a "version") of the object, without actually updating the persistent, stored object itself. The user eventually decides whether to permanently commit the changes encompassed by the transaction, or whether to discard them. If the user chooses to commit, then the updated object in the version is copied to the persistent store. If the user chooses to discard (or "roll back") the changes, the persistent store is left unchanged.

The technique defined in this related application enables nested transactions to have views of an object that are completely independent from the views of other concurrent transactions. A nested transaction is one where the transaction is logically viewed as a tree, each subtree being either nested or flat. Nested transaction subtrees are internal nodes within the tree structure, and flat transactions are leaf nodes of the tree. The root of a transaction is called the "top-level transaction"; nodes below this top level are called "subtransactions". A transaction's predecessor node in the tree is called a "parent" and nodes below that transaction in the tree are called "child" nodes, using the terminology for tree structures that is commonly known in the computer programming art. Within the scope of a nested transaction, a subtransaction at any level may either commit its changes or roll them back. When a subtransaction commits its changes, the changed values are made accessible upward in the tree only to the parent node of this subtransaction. The change does not actually update the persistent store unless and until the top-level transaction is committed. Further, the changes are not visible to any siblings of the committed subtransaction, or to any nodes other than the parent (such as subtransactions that are siblings of this parent), until the changes propagate upward through the tree by commits at higher-level nodes. If a subtransaction rolls back, then the changes made by this subtransaction and all its children are discarded, without updating the persistent store.

The nature of the complex multi-user applications executed in an enterprise computing environment require that the EJBs being used in application deployment can be concurrently accessed, with consistent views of the EJBs being provided to each accessing application. The application or the application user must be able to commit or roll back the work that has been done from any view of the EJB, and from all views opened from that view in a nested fashion. Version 1.0, section 9.5 of the Enterprise JavaBeans specification ("Enterprise JavaBeans", dated Mar. 21, 1998, published by Sun Microsystems, Inc.) states that when an EJB is accessed concurrently from multiple transactions, the consistency of the EJB between the transactions will be handled automatically by functions that will provide isolation between transactions. The component that is to provide this isolation is the container. The EJB specification discusses two alternative methods with which a container might isolate transactions, but does not provide implementation details or guidelines for mechanisms that might be used. The two methods discussed therein are (1) serialized access to EJBs and (2) creating multiple instances of the EJB, one for each transaction in which the EJB is being accessed.

The inventors of the present invention believe that serialized access is an unacceptable solution for isolating EJBs among transactions, because a serious performance penalty is involved. Serialized access requires that the EJB be locked when a transaction accesses it, such that subsequent transactions must wait until the lock is released by the earlier transaction. Many typical enterprise applications will have transactions that span long periods of time, so that a lock by one application will likely result in corresponding delays while the subsequent applications must wait. Users of computer applications have come to expect nearly instantaneous response times from their applications. The delays that will potentially result from applications using serialized access are unlikely to be acceptable from a user perspective.

According to the second alternative method for container isolation described in the EJB specification, each transaction that accesses an EJB will have its own instance of the EJB, as stated above. The container activates a new instance of the EJB for each accessing transaction, and the underlying database in which the EJB is stored is expected to provide serialization among transactions during database access calls (without any transaction serialization requirements being placed upon the container), according to section 9.5 of the EJB specification. While this multiple instances approach avoids the performance penalties inherent in the serialized access approach, managing the instances is a very complex task. Placing the responsibility for transaction serialization of the instances on the database system addresses only the end result of the transaction—that is, making sure that multiple database transactions cannot make changes to one persistent EJB in an interleaved manner that would very likely lead to unpredictable results. A solution that enables changes to be accessible to views within a transaction, yet isolated appropriately among nested subtransactions within that transaction and isolated from other transactions within the same application, must then be provided by logic within the application itself. The solution in the related application for managing objects using transactions cannot be used to manage EJBs, because as discussed earlier, the logic for an EJB is stored in the bean and thus changes to the bean that are made by executing this logic are not automatically detectable by the EJB's container or its wrapper. Therefore, neither the container nor the wrapper knows when the EJB needs to be persisted (i.e. stored to the persistent store).

Accordingly, what is needed is a technique whereby transaction isolation for EJBs can be efficiently implemented using multiple instances, such that a particular EJB can be accessed from multiple concurrent and/or nested transactions while ensuring consistency among the transactions and among the nested subtransactions, and while permitting these concurrent and/or nested transactions to have completely independent views of the EJB. The present invention provides a technique for representing changes made by a transaction with a tree structure that is internally managed by the application program wherein the changes were made. Each transaction within an application has an independent version of the EJB, and thus an independent transaction tree where the changes made by that transaction are stored during the course of the transaction. Each subtransaction within a nested transaction may also have an independent view of the EJB, by storing that subtransactions' changes at an intermediate level within the tree. The present invention also provides a technique for merging multiple views within a nested transaction, and committing the merged result to the persistent data store.

SUMMARY OF THE INVENTION

An object of the present invention is to provide a technique for ensuring consistency of Enterprise JavaBeans among multiple applications that are concurrently accessing the same EJB.

Another object of the present invention is to provide this technique by using transactions.

A further object of the present invention is to provide this technique such that nested transactions may be used in an application, while enabling each subtransaction to have an independent view of the EJB.

Yet another object of the present invention is to provide this technique in a manner that appropriately isolates changes made by multiple transactions within an application, as well as changes made by multiple subtransactions within a transaction.

Still another object of the invention is to provide a technique for implementing a transaction management subsystem which is optimized for nested transactions and supports multiple concurrent transactions.

Another object of the invention is to detect data conflicts when a user or application attempts to commit changes to EJBs in a persistent data store.

A further object of the invention is to resolve data conflicts, where possible, after they have been detected.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for managing Enterprise JavaBeans (EJBs) and maintaining an integrity of the EJBs in systems which permit access to the EJBs by multiple concurrent and/or nested transactions, the transactions being comprised of one or more subtransactions and the EJBs being comprised of a first instance data part, comprising: a subprocess for creating an independent version of a selected EJB in a view associated with each of a plurality of subtransactions, the version comprising a business logic part, a second instance data part, and version status data, wherein the subprocess for creating further comprises initializing the second instance data part from the first instance data part; a subprocess for temporarily making one or more modifications to the first instance data part of the selected EJB, the modifications requested by a selected one of the subtransactions, by making the modifications to the corresponding second instance data part in the independent version in the associated view of the selected subtransaction; a subprocess for committing the modifications upon a commit request; and a subprocess for performing a rollback of the modifications upon a rollback request.

Preferably, the subprocess for committing further comprises: (1) a subprocess for use when the subtransaction is not a top-level transaction in a transaction tree, comprising: a subprocess for attempting to merge the modifications to a parent of the subtransaction upon the request to commit the modifications; a subprocess for cancelling the commit request if the subprocess for attempting detects one or more unresolvable data conflicts with one or more separate modifications made to the selected EJB, wherein the separate modifications are stored by the parent in one of the independent views, the one view being associated with the parent; a subprocess for performing the merge of the modifications to the independent view associated with the parent if the subprocess for attempting does not detect any of the unresolvable data conflicts; and a subprocess for committing the merged modifications to the independent view associated with the parent; and (2) a subprocess for use when the subtransaction is the top-level transaction in the transaction tree, comprising: a subprocess for committing the modifications with a corresponding EJB in a persistent store; a subprocess for merging the modifications to a global transaction if the subprocess for committing does not detect an error condition; and a subprocess for discarding the top-level transaction and any subtransactions related to the top-level transaction in the transaction tree. Or, the subprocess for committing may further comprise: (1) a subprocess for use when the subtransaction is not a top-level transaction in a transaction tree, comprising: a subprocess for attempting to merge the modifications to a parent of the subtransaction upon a request to commit the modifications; a subprocess for cancelling the commit request if the subprocess for attempting detects one or more unresolvable data conflicts with one or more separate modifications made to the selected EJB, wherein the separate modifications are stored by the parent in the independent view associated with the parent; a subprocess for performing the merge of the modifications to the independent view associated with the parent if the subprocess for attempting does not detect any of the unresolvable data conflicts; and a subprocess for committing the merged modifications to the independent view associated with the parent; and (2) a subprocess for use when the subtransaction is the top-level transaction in the transaction tree, comprising: a subprocess for committing the modifications with a corresponding EJB in a persistent store; and a subprocess for discarding the top-level transaction and any subtransactions related to the top-level transaction in the transaction tree.

In either case, the subprocess for attempting preferably further comprises invoking application-specific logic to determine when the separate modifications indicate that one of the unresolvable data conflicts is found, and the subprocess for merging further comprises invoking application-specific logic to resolve any resolvable data conflicts. The transaction tree may represent a plurality of subtransactions in a nested transaction.

The present invention further provides a system for managing transactions in a networking environment which permits multiple transactions to access one Enterprise JavaBean (EJB) at a same time, comprising: means for providing each of the transactions with a view which includes an independent version of the EJB which the transaction or a related transaction is working with, wherein the independent version has a business logic part, an instance data part, and a version status part, wherein the instance data part is initially copied from a corresponding part in a persistent store containing the EJB; means for determining if an unresolvable data conflict will occur between versions of the EJB in different transactions when one of the transactions is requested to be committed; means for canceling the commit if one or more unresolvable data conflicts will occur; means for merging the versions of the EJB if none of the unresolvable data conflicts will occur; and means for committing the merged versions. Preferably, the determining means determines that no unresolvable data conflict will occur if one of an EJB version from a child transaction and a parent transaction which are to be merged has not been modified or where both of the EJB versions have been modified from the child transaction and the parent transaction, logic is applied that determines that the EJB versions can be successfully merged; and the merging means further comprises means for invoking application-specific logic to resolve any resolvable data conflicts.

The present invention will now be described with reference to the following drawings, in which like reference numbers denote the same element throughout.

DESCRIPTION OF THE PREFERRED EMBODIMENT

Figure 1:
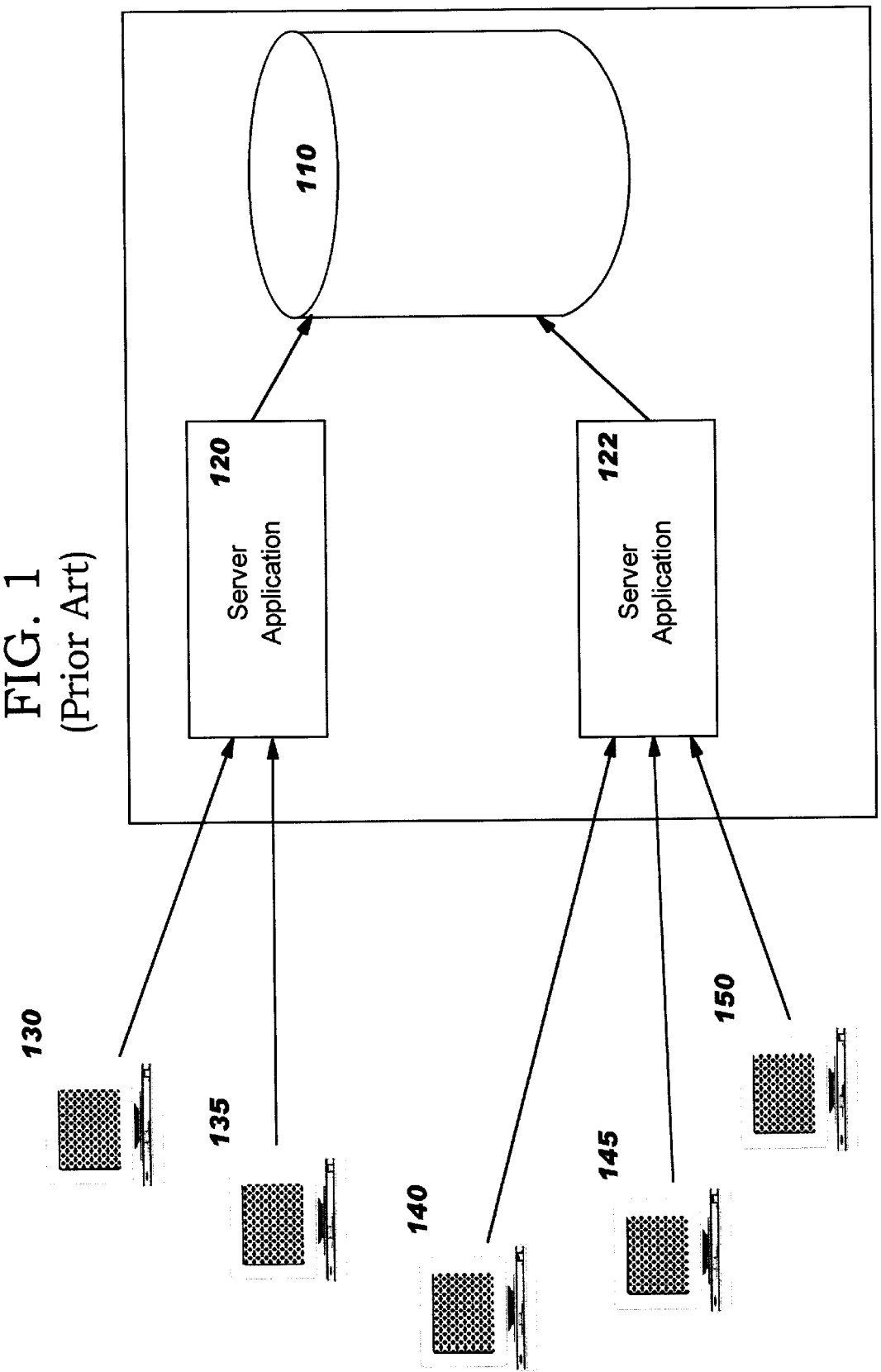
FIG. 1 depicts a simple example of an enterprise computing environment of the prior art in which multiple server applications may each serve multiple concurrent client transactions, each accessing an overlapping set of EJBs.
Figure 2:
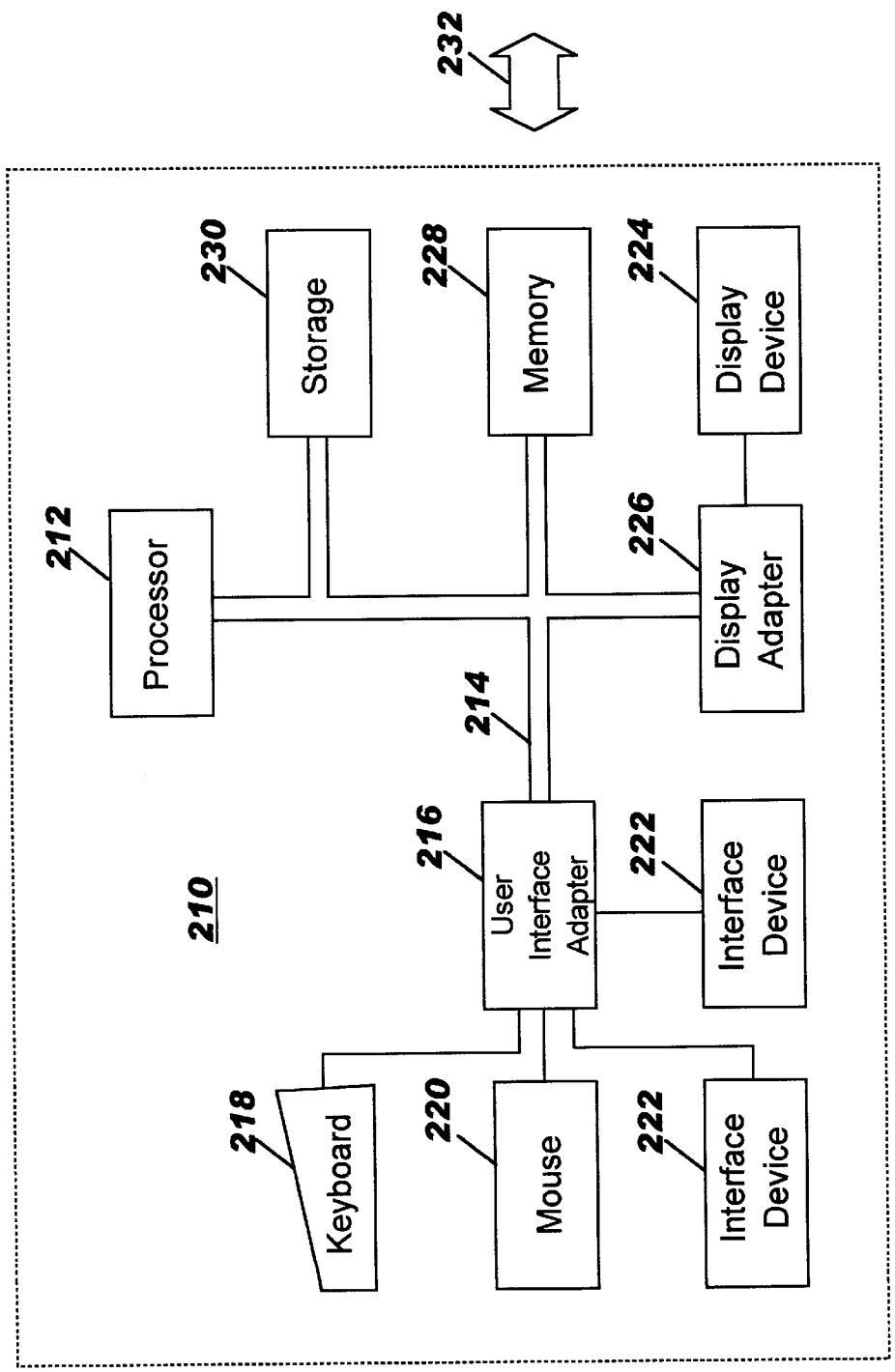
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Figure 3:
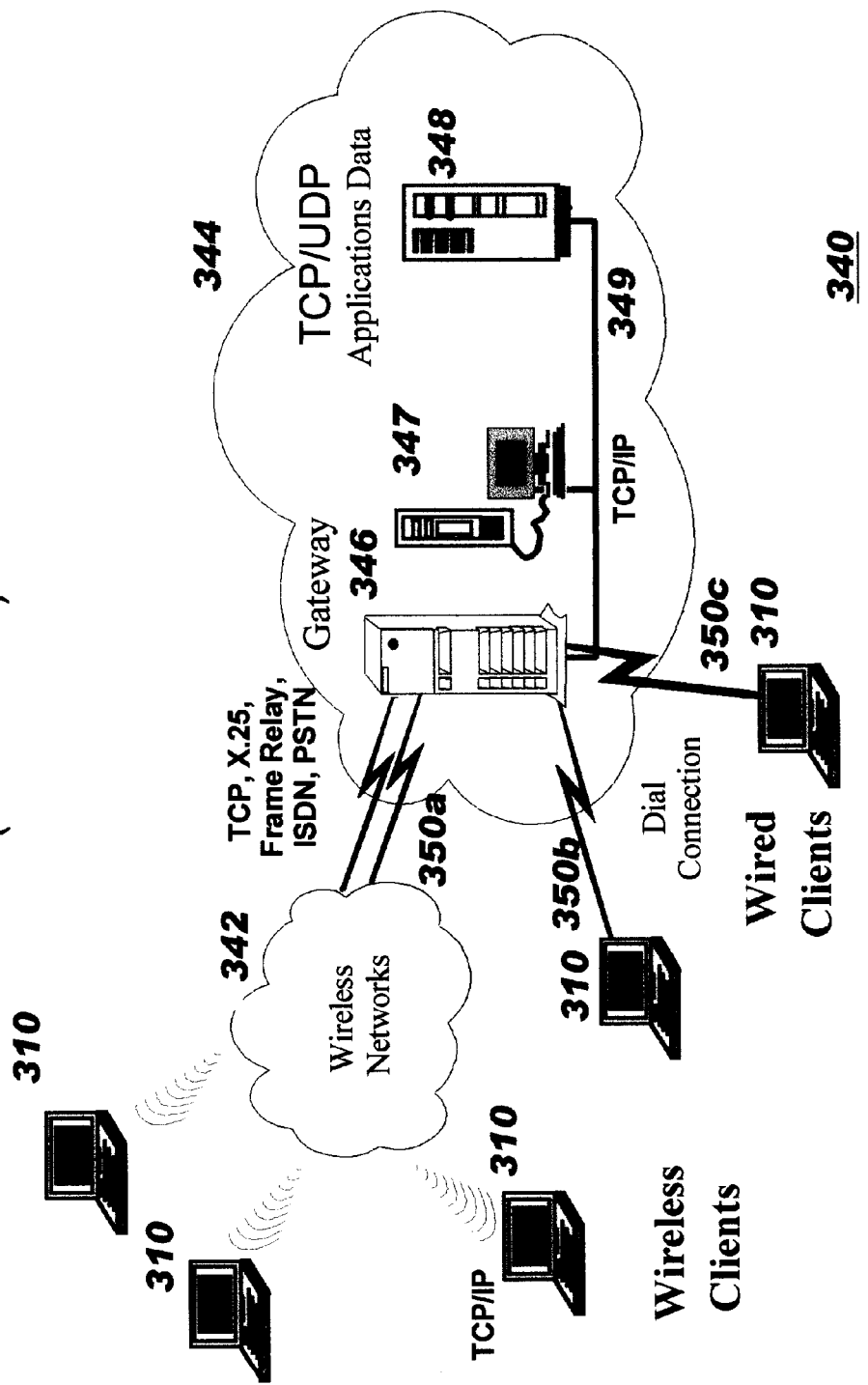
FIG. 3 is a diagram of a networked computing environment in which the present invention may be practiced.

FIG. 3 illustrates a data processing network 340 in which the present invention may be practiced. The data processing network 340 may include a plurality of individual networks, such as wireless network 342 and network 344, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 342 and 344 may also include mainframe computers or servers, such as a gateway computer 346 or application server 347 (which may access a data repository 348). A gateway computer 346 serves as a point of entry into each network 344. The gateway 346 may be preferably coupled to another network 342 by means of a communications link 350a. The gateway 346 may also be directly coupled to one or more workstations 210 using a communications link 350b, 350c. The gateway computer 346 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 346 may also be coupled 349 to a storage device (such as data repository 348). Further, the gateway 346 may be directly or indirectly coupled to one or more workstations 210.

Those skilled in the art will appreciate that the gateway computer 346 may be located a great geographic distance from the network 342, and similarly, the workstations 210 may be located a substantial distance from the networks 342 and 344. For example, the network 342 may be located in California, while the gateway 346 may be located in Texas, and one or more of the workstations 210 may be located in New York. The workstations 210 may connect to the wireless network 342 using a networking protocol such as the Transmission Control Protocol/Internet Protocol ("TCP/IP") over a number of alternative connection media, such as cellular phone, radio frequency networks, satellite networks, etc. The wireless network 342 preferably connects to the gateway 346 using a network connection 350a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 346 using dial connections 350b or 350c. Further, the wireless network 342 and network 344 may connect to one or more other networks (not shown), in an analogous manner to that depicted in FIG. 3.

Software programming code which embodies the present invention is typically accessed by the microprocessor 212 of the workstation 210 or server 347 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The enterprise computing environment in which the present invention may be used includes an Internet environment, an intranet environment, an extranet environment, or any other type of networking environment. These environments may be structured using a client-server architecture, or a three-tiered architecture, whereby a client-server environment is extended by adding data repositories as a third tier (such that the server now occupies the middle tier), and where these data repositories contain information that may be accessed by the server as part of the task of processing the client's request. This three-tiered architecture recognizes the fact that many client requests do not simply require the location and return of static data from the server, but require an application program to perform processing of the client's request in order to dynamically create and format the data to be returned. In this architecture, the server augmented by the component performing this processing may be referred to as an "application server."

The preferred embodiment of the present invention will now be discussed with reference to FIGS. 4 through 9.

In the preferred embodiment, the present invention is implemented as a computer software program. The program code of the preferred embodiment is implemented as objects (classes and methods) in the Java object-oriented programming language. However, other programming languages that enable access to Enterprise JavaBeans (or objects having the properties of Enterprise JavaBeans) may be used equivalently, without deviating from the inventive concepts disclosed herein. The program implementing the present invention will be used where it is necessary to ensure consistency of EJBs among multiple concurrent and/or nested transactions, while providing the capability for independent views within transactions and within subtransactions. The implementation of this logic may execute on any device capable of providing an EJB container, and will execute preferably as Java classes which are invoked during deployment of applications using EJBs. Note that while the present invention is discussed in terms of its use in an enterprise computing environment, this is not meant to limit the invention in any way: the invention may be used beneficially in any environment in which EJBs need to be accessed concurrently by more than one user or application, or in which nested transactions upon EJBs are needed.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. A developer creates an application by adding classes from a class library to the software application being created. A copy, or "instance", of a class is then included in the application. Using the Java terminology, one or more classes may be combined to form a JavaBean, and one or more JavaBeans may then be combined to form an application. For the enterprise environment, Enterprise JavaBeans may be used in order to provide access to remotely-stored objects during development and deployment, as discussed earlier. These concepts and techniques of Java programming are well known to those skilled in the art, and will not be discussed in depth herein.

The concept of a persistent store is also well known, and will not be described in detail herein. In a client/server or three-tiered environment, a persistent store of objects may be maintained in one or more locations which are accessible by applications (and their users) in the computing environment, such as one or more common databases. Such databases may be maintained in, for example, the data repository 348 of FIG. 3 or the long term storage 230 of FIG. 2.

The present invention provides a transaction subsystem in an application program of an enterprise computing environment that allows the same EJB to be accessed from multiple concurrent and/or nested transactions, in order to support multiple users or applications that require the capability to access the same EJB at substantially the same time. This mechanism comprises managing multiple concurrent and/or nested transactions against EJBs, and creating and managing versions of EJBs within the transactions. Without this mechanism it would be difficult, if not impossible, to implement complex multi-user business applications that utilize EJB technology.

The technique for isolating changes to objects between transactions, and between various nodes of a single nested transaction, is described in the related application. This technique makes use of an optional optimization strategy that minimizes the number of round-trips that are required from the application to the data store. This optimization is accomplished using a single "global transaction", also referred to as a "shared transaction". This shared transaction is defined as being read-only from the perspective of the application program. One such shared transaction exists in each application that uses the technique of this related application to provide independent views within nested transactions. (A "view" may conceptually be thought as what the application "sees" as the current representation of information.) When a top-level transaction commits its changes, a copy of the updated object is stored in the view for this shared transaction, as well as updating the object in the persistent store. This enables subsequent transactions within the application to efficiently have access to the updated object (that is, by accessing the locally-stored copy in the shared transaction), without the requirement of retrieving the updated copy from the persistent store (which would require the overhead processing of a round-trip to the data store).

Figure 4:
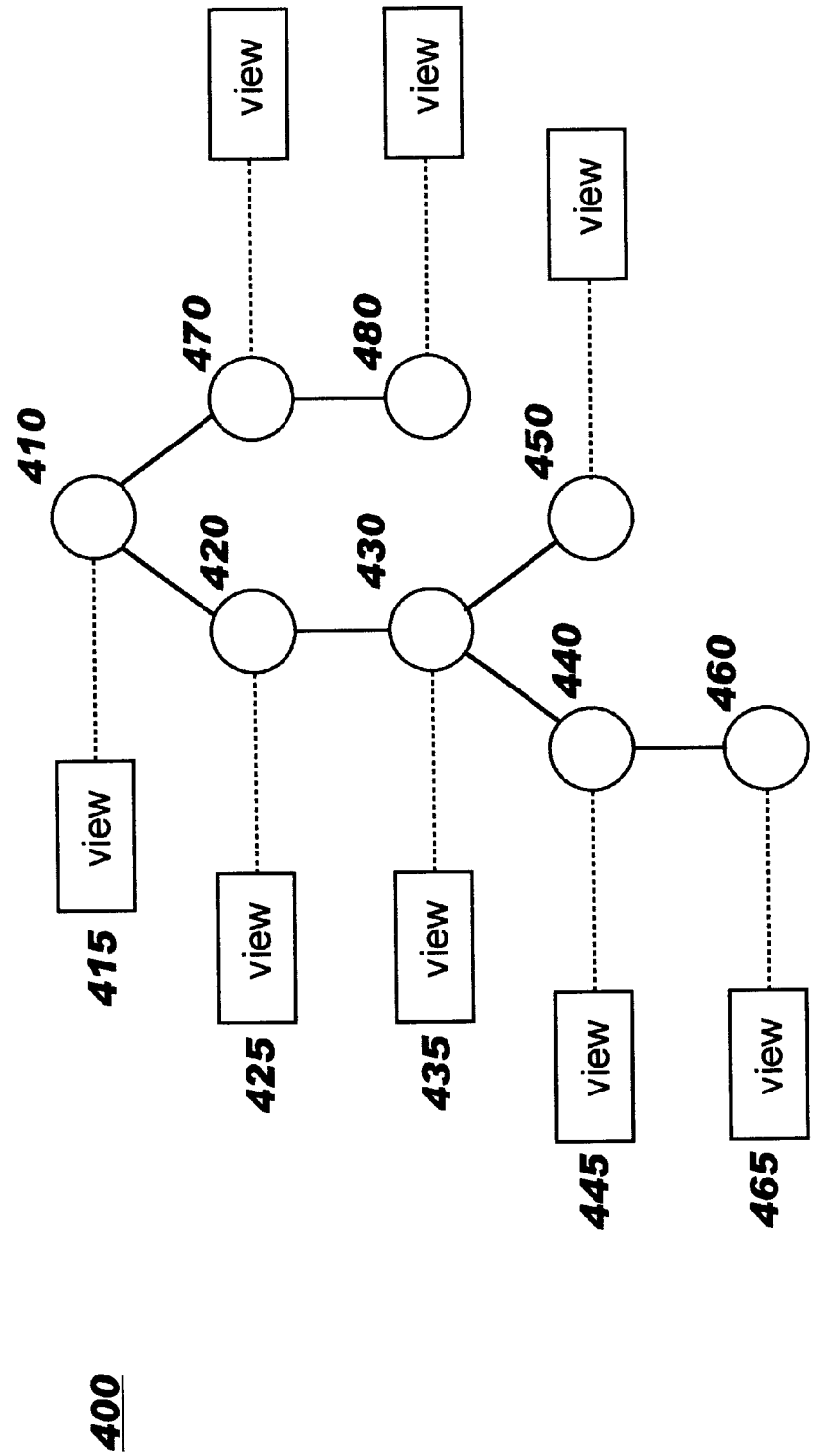
FIG. 4 illustrates a nested transaction hierarchy and views of transactions within an application program, in accordance with the present invention.

FIG. 4 illustrates a transaction tree 400 with which multiple nested transactions may be managed, according to the approach and structure defined in the related application. A shared transaction 410 is provided at the top of the tree. As previously stated, one such shared transaction exists at all times within an application using the present invention when this optional optimization is implemented. This shared transaction 410 is shown in FIG. 4 as being the parent transaction for two child transactions 420 and 470. Both transactions 420 and 470 are top-level transactions. Within the type of complex business application typically found in an enterprise computing environment, there may be many more than two top-level transactions: two are used in FIG. 4 for illustrative purposes only. Whenever a new top-level transaction is created within the application, it becomes a child of the shared transaction 410. When a top-level transaction completes by either committing or rolling back, it is removed from the transaction tree 400, so that the shared transaction 410 has one less child. The subtree structures shown in FIG. 4 beneath the two top-level transactions (comprising nodes 430 through 460, and 480 respectively) are also for purposes of illustration only. Subtrees correspond to the subtransactions within a transaction as previously stated, and thus may be nested to an arbitrary depth, with an arbitrary width, or there may be no subtrees beneath a top-level transaction. The tree structure depicted in FIG. 4 was used in the related application for managing transactions on objects, and is used in a similar manner in the present invention for managing transactions on EJBs.

During operation of an enterprise application, a particular EJB may be shared within and across multiple applications, where each application may have many users. In addition, each EJB may exist in several different states: it may exist only within this application (if this application is in the process of creating it, and has not yet committed it to the persistent store); it may exist in this application and also in the persistent store; or it may exist only on the persistent store but not in this application. In the latter case, other applications may have internally-accessible versions of the EJB, even though the current application does not. (When an EJB is discussed herein as being internally-accessible to an application, or existing within an application, this means that the EJB has been loaded into storage or memory accessible by the workstation on which the application is executing, or is otherwise locally available other than by retrieving it from the persistent store.) These factors make managing EJBs quite complicated. A further complication is that even at a single workstation, multiple nested transactions may be occurring. This is quite common in GUI-based applications. In such applications, windows are often opened within windows, with each window constituting a separate transaction or subtransaction. The details of a particular application will determine where the boundary for a new transaction lies. For example, suppose the enterprise application provides call center support for a business having a large number of customers, and the application user is a person who handles calls from these customers. The application will most likely provide some type of "main window", where the user typically begins accessing the application services for each new call. This main window may be used to enter the customer's name or identification number ("ID"), for example. Detailed information about the customer's account may then be accessible through a number of subsequent windows that may be accessed after first entering the customer's name or ID into the main window. A logical way to structure the flow within such an application is to treat each customer's processing as a separate transaction. The subsequent windows opened for a customer's records may then be treated as subtransactions. One user of this application may be able to handle more than one call at a time (by putting customers on hold temporarily, for example), and start the processing for each new caller (and therefore a new transaction) while windows are already open for the earlier callers. This in one example of the manner in which an application program may have multiple concurrent and/or nested transactions active at the same time.

Where multiple concurrent and/or nested transactions are possible, each of the transactions (and subtransactions) may share or utilize the same EJB; but the capability must be provided for the view of the EJB to be unique to each transaction (and subtransaction). In addition, the capability must be provided for actions performed relative to an EJB to be isolated to the transaction or subtransaction performing the actions. For example, suppose the application is an Internet-based shopping-cart program that provides for customers to browse an on-line catalog and order items from a product inventory, where this process may be treated as a transaction. Shoppers using such programs may tend to take a long time to complete their shopping transaction, and may be likely to remove items from their shopping cart or to cancel their entire order. If there are 6 widgets left in inventory, and Customer 1 begins placing an order for 5 of them just before Customer 2 begins to order another 5, the ordering application may wish for Customer 2 to see the available inventory as 6 instead of 1. This is because Customer 1 might decide to cancel his order, making the widgets available to Customer 2. If the inventory count had already been decreased, Customer 2 might have decided prematurely to cancel his order based on his impression that the remaining inventory was insufficient. (Obviously, if both customers proceed with their orders, application-specific logic must resolve conflicts such as the inventory shortage in the example.)

At the same time that this isolation capability is needed, a subtransaction (the placing of a particular product into the shopping cart, for example) may be cancelled by the user as he changes his mind about a subtransaction within the progression of windows for a transaction (or other equivalent progression within a transaction), so that the capability to handle this situation must also be provided. (Depending on the particular application, transactions and subtransactions may also be cancelled by the application itself.) While any modifications made to an EJB within the cancelled subtransaction, and any of its children, must necessarily be cancelled when the subtransaction is cancelled, any changes made by a higher-level window or subtransaction in the transaction should not also be cancelled. Views are used by the present invention to address this problem. In this use of the "view" concept, the current representation of information the application sees in a view is the current representation of the EJB. Thus by providing each transaction, and each subtransaction (when appropriate), its own view of the EJB, each transaction and subtransaction is able to see a completely independent representation of the EJB that is isolated from any other transaction and subtransaction.

The EJB specification introduced the concept of using multiple instances of EJBs, as previously discussed. In the present invention, these multiple instances are referred to as multiple "versions". The technique with which these versions are used will be referred to herein as "versioning". The present invention uses versioning of EJBs to provide the independent views for the transactions and nested subtransactions, enabling the management of access to EJBs from multiple concurrent and/or nested transactions. According to this approach, multiple versions of an EJB may be used internally in an application program; each transaction and subtransaction may then have independent versions of an EJB to represent the changes made by that transaction or subtransaction. These multiple internal versions are managed using views, where each transaction and subtransaction may have its own view of an EJB.

The concept of object versioning combined with transactions was disclosed in the related application. However, applying this technique to EJBs, and the particular changes required for managing EJBs with this technique, is new to the present invention. According to the present invention, each transaction is provided with its own version of each EJB that it accesses, and these versions are maintained in a view for the transaction. Each subtransaction may further have its own view of the EJB, if that transaction or its children accesses the EJB. It is important to note that the data represented in one subtransaction's view for a particular EJB may be different from the data represented in another subtransaction's view within the same transaction. FIG. 4 illustrates the fact that each transaction and subtransaction has a view logically associated therewith. For example, the top-level transaction 410 has a view 415 associated therewith; the subtransaction 420 has a view 425 associated therewith, etc.

Figure 5:
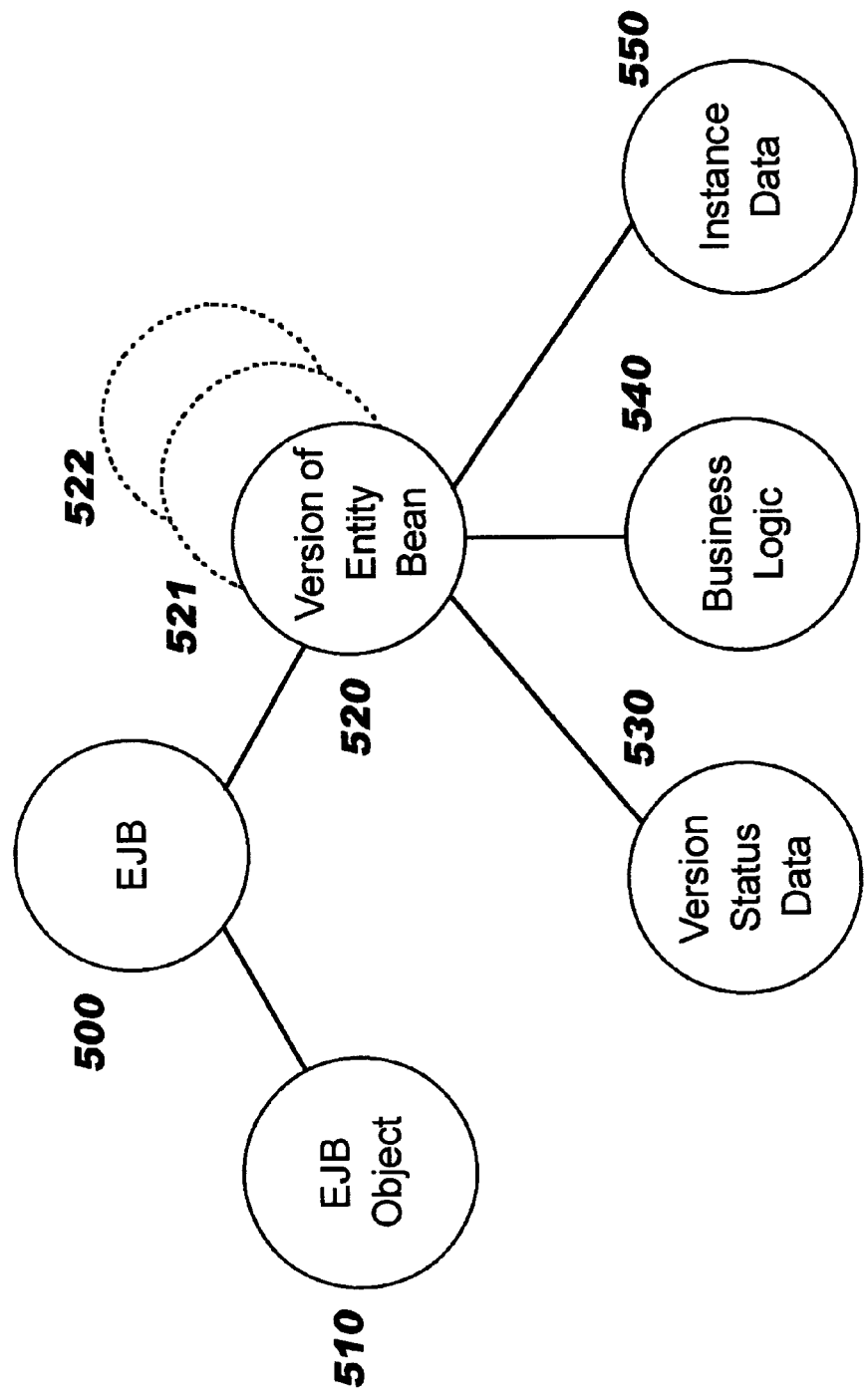
FIG. 5 illustrates the logical partitioning of an EJB into an EJB Object and an entity bean, and the logical structure that will be used to represent versions of an entity Bean in a transaction view in accordance with the present invention.

In an object-oriented environment, each transaction carries out its function by accessing objects such as instances of classes, which, as discussed above, are a combination of logic and data. Data and logic in an EJB which needs to be manipulated by an application is maintained in what may be referred to as "business objects". According to the present invention, each view includes a local copy of a subset of the business objects, the subset comprising those business objects which are active for the transaction currently being performed. In the present invention, the business objects of interest are EJBs. The EJB specification divides EJBs logically into two parts: an EJB Object, and an entity Bean. FIG. 5 shows how these elements are logically structured, where an EJB 500 is partitioned into an EJB Object 510 and a version 520 of an entity Bean. The EJB Object 510 functions as a wrapper for the EJB. A single EJB Object 510 is created by the container for each application that accesses an EJB. The EJB specification states that the logic or behavior 540 of the EJB, and the instance data 550 for a particular instance of the EJB, are both in the version 520. (This is a change from the way in which the business objects in the related invention are structured: the logic of the business object is in the bean for this invention, and not in the wrapper of the business object. Thus, the present invention provides specific accommodation for this unique feature of EJBs, as will be discussed in more detail herein.) The present invention adds another logical substructure to each version 520, beyond what is specified in the EJB specification, which is version status data 530. This version status data 530 is used internally by an implementation of the present invention to keep track of information about this version's status, such as whether the version has been modified. According to the novel features of the present invention, each time a method in the logic 540 of the bean changes the bean version (i.e. the instance data 550 for the version), this version status data 530 stores the knowledge that the bean has been modified in order to later communicate this information upward in the transaction tree 400 upon a commit (so that the root transaction will detect that the changes must be reflected in persistent storage). Version status data is described in more detail in the following paragraphs.

Even though messages are invoked on the entity bean by sending a message to the wrapper (the EJB Object), the wrapper is unable to determine when the bean is being changed in order to control persistence of the EJB. One method, once invoked by the wrapper, may subsequently invoke other methods. These subsequent invocations do not use the wrapper. The present invention uses version status data to keep track of changes that are made. In this manner, the effect of the methods (that is, changing the bean) can be communicated back to the wrapper, and the changes can be persisted to the data store.

Many versions of a given entity bean may exist within an application at one time. (In addition, versions of many different entity beans may also be present.) FIG. 5 shows multiple versions of one entity bean conceptually with versions 521 and 522 in addition to version 520. FIG. 5 does not show version status data, business logic, and instance data for versions other than 520; however, it is to be understood that each version of an entity bean has each of these three types of information according to the novel features of the present invention.

As will be further described below, when an EJB 500 is first accessed within a transaction, a version 520 of the entity bean is added to the transaction's current view. For example, if top-level transaction 420 from FIG. 4 refers to an EJB 500 for the first time, its view 425 will then have an instantiation of the structure for that EJB as depicted by elements 520, 530, 540, 550 in FIG. 5. (The EJB Object 510 for an application is created the first time any transaction in the application refers to the EJB 500.) Suppose that subtransaction 440 then accesses the same EJB 500 to make changes to it. The access itself will cause a version 521 to be copied from the view at 425 into the views at 435 and 445. The subtransaction 440's changes will then modify the view at 445. When another EJB in a transaction or subtransaction refers to an EJB 500, the reference is actually directed to the application's single EJB Object 510. The EJB Object 510 dynamically determines which is the current subtransaction, and logically connects itself to the version in that subtransaction's view so that the changes being requested in the reference will be made to the correct version of the entity bean. Thus, in this manner, the EJB Object and version together implement a dynamic reference to an EJB.

The version status 530 includes information as to whether the EJB has been newly created by an application ("state= new") or was read from a database or data store ("state= old"), and whether the version has been marked for deletion ("delete=[yes|no]"). If the version is marked as "delete= yes", this status is promoted upward throughout the transaction tree upon a commit so that a delete command can be issued to the persistent store when the top-level transaction commits. The version status data 530 also includes a "modified" flag that is used to synchronize the versions internally (within the transaction tree), and an "external-synchronization" flag that indicates whether the version needs to be synchronized with the persistent store. This external-synchronization flag is set to "yes" whenever an entity bean is changed. Also, a modification level or number is maintained for each version. The modification level of a version in a child is compared with the modification level in its parent when determining whether a merge will be successful. A preferred embodiment for implementing this modification level handling is described herein, but alternative techniques enabling the same end result may be used equivalently. When a version is first created for an EJB, its modification level is set to zero to indicate that no modifications have been made. Each subsequent modification by the transaction having this version causes the modification level to be incremented. When a version is copied to a child, the child version maintains 2 modification levels: the version its parent had at the time of the copy, and the child's modification level (which is initially set to the same value as the parent's version, and then incremented within the child transaction.) The instance data 550 includes the current values for instance data for this version of the entity bean. The application may be referencing the instance values (in read-only mode), or it may be changing them (in a read-write mode). When the instance data 550 for this version 520 of an entity bean has not been changed, the version status data 530 will include a "modified=no" flag; otherwise, the flag will be set to "modified=yes". (While values of flags are described here using text, it will be obvious to one of ordinary skill in the art that an implementation will preferably treat these values as binary data.)

Figure 6A:
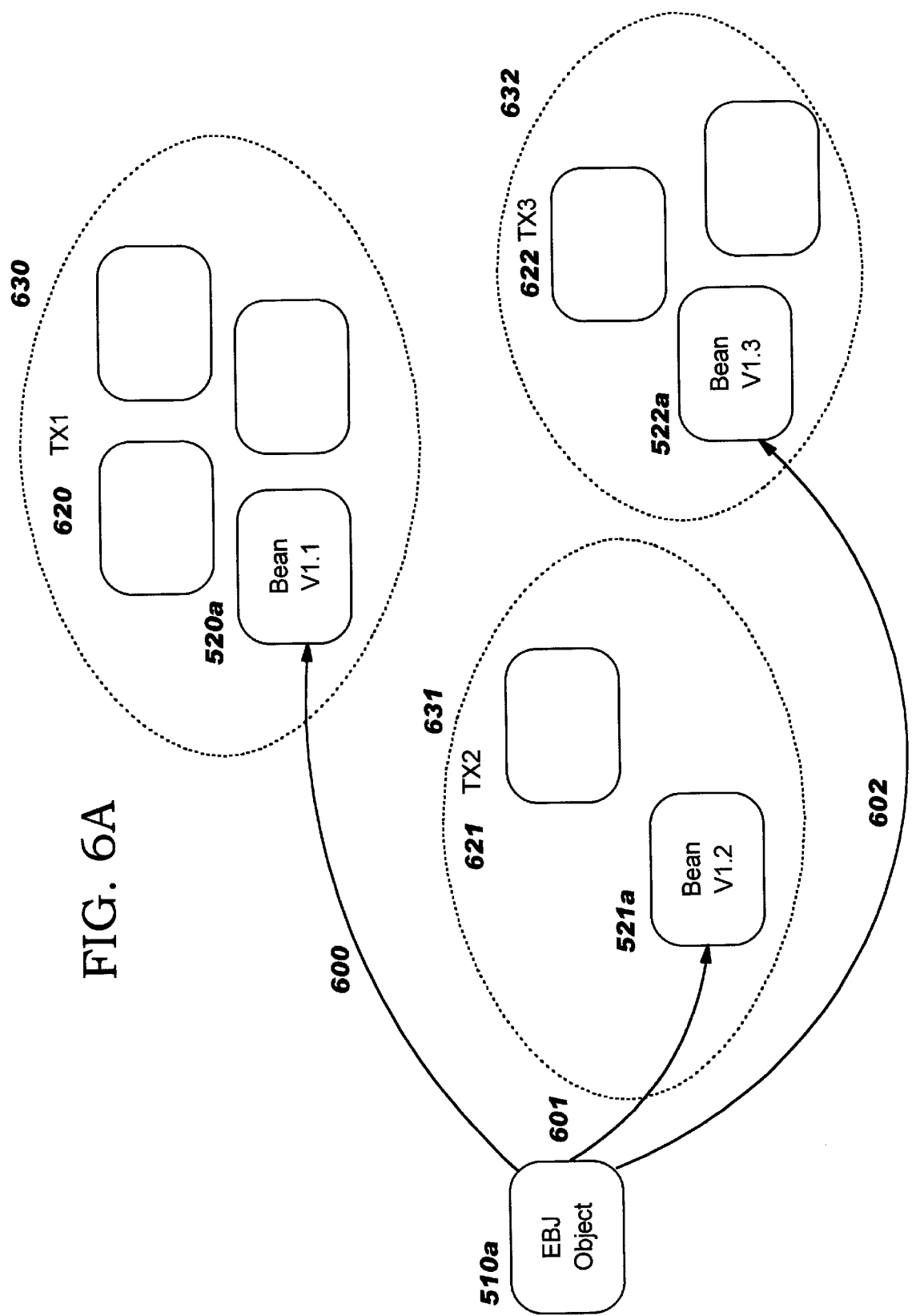
FIGS. 6A–6B illustrate interactions between an EJB Object and the versions of the entity bean, both conceptually and with a simple example, when an application accesses an EJB.

FIG. 6A shows the relationship between an EJB Object 510a and versions of its entity bean, where three versions 520a, 521a, and 522a are depicted. This diagram represents the situation where three transactions, or three subtransactions, or a combination of three transactions and subtransactions are concurrently accessing an EJB within an application. These will all be referred to as transactions for ease of reference. The dotted ellipses 630, 631, 632 show multiple versions of entity beans that are being used by the 3 transactions 620, 621, 622. For example, transaction 1 (shown as "Tx 1" at 620) has versions of 4 beans, where one of them is a version 520a of some particular bean identified as "Bean V1.1". This bean is also being accessed by the other transactions. Transaction 2 (shown as "Tx 2" at 621) has a version 521a of this bean, indicated as "Bean V1.2". The EJB Object 510a is shown by arrows 600, 601, 602 as accessing the versions of the bean. As stated above, the EJB Object 510a is responsible for determining which version is associated with the current transaction, so that messages sent by the application to the EJB (and intercepted by the EJB Object and then redirected to the entity bean) will apply to the proper version of the entity bean.

Figure 6B:
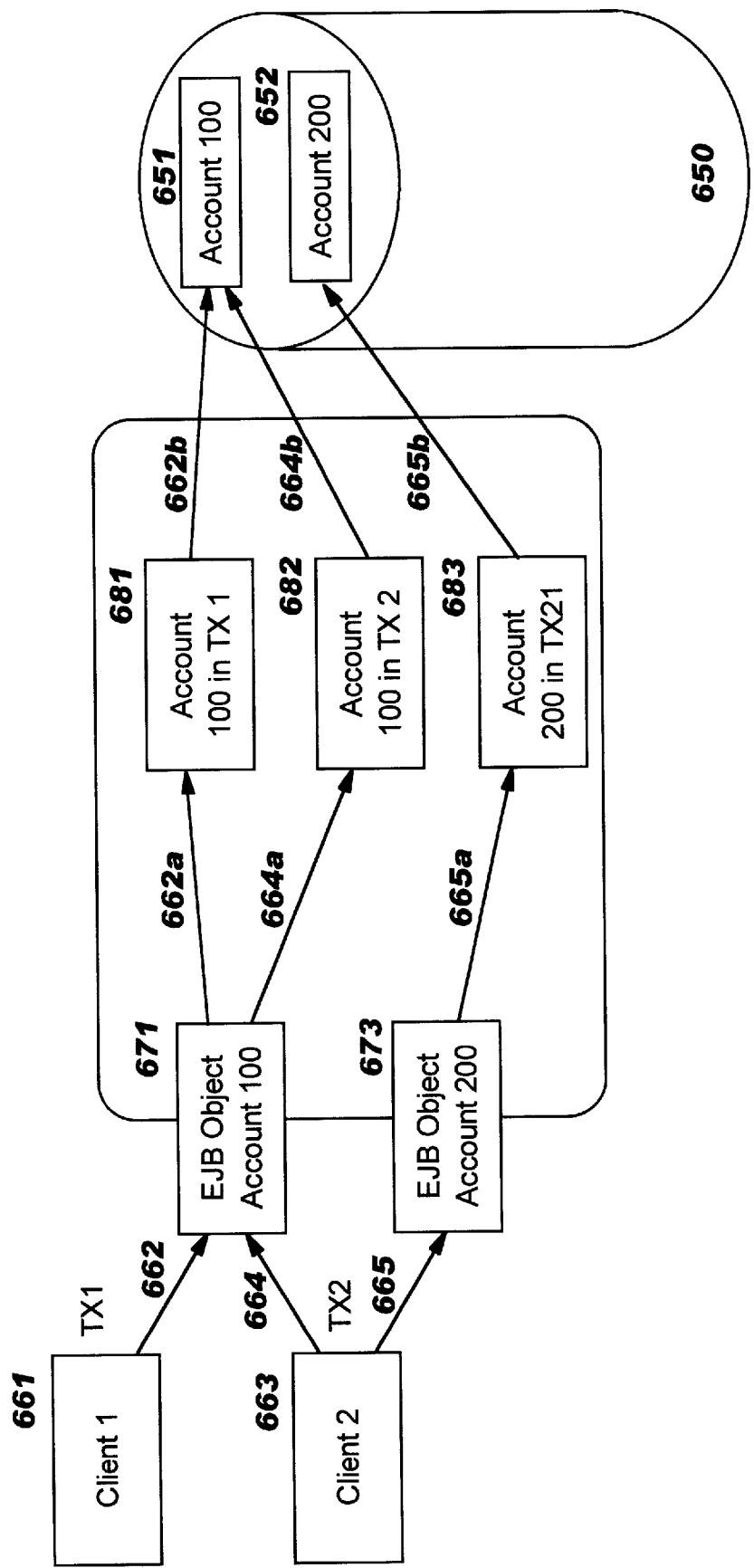

FIG. 6B illustrates a simple example of this concept. Suppose a data store 650 includes information about customer accounts. Two instances of accounts are depicted, at 651 and 652, and are identified as "Account 100" and "Account 200". The objects for these customer accounts may be created as EJBs, so that they can be accessed remotely in an enterprise environment. Two clients 661 and 663 are shown, where Client 1 has a transaction designated as "TX 1" at 662 and Client 2 has a transaction designated as "TX 2" at 664 and 665. Client 1 may be working with a company's accounts payable application, processing checks against the company's checking account (Account 100). Client 2 may be the same person, using the same application program to start another transaction when he realizes, for example, that he first needs to transfer funds from the company's Account 200 into Account 100. Client 1's transaction thus requests access 662 to the EJB for Account 100, while Client 2's transaction requests access 664, 665 to the EJBs for both Account 100 and Account 200. The container 680 for the Account EJBs has created an EJB Object for each EJB, as shown at 671 and 673. Three versions of entity beans are also shown within the container, as 681, 682, and 683. Version 681 is a version of the entity bean for Account 100 that is currently storing information for Client 1's transaction TX 1 (shown at 662a). Version 682 is another version of this entity bean, storing the information about Account 100 that Client 2's transaction TX 2 is using (shown at 664a). The EJB Object 671 manages the requests from both clients, accessing the proper version 681 or 682. Version 683 is a version of the entity bean for Account 200, being used within this application only by Client 2's transaction TX 2 (shown at 665a). Thus, transaction TX 1 has only one entity bean version in its transaction tree, while transaction TX 2 has two entity bean versions in its tree. The versions are shown in FIG. 6B (at 662b, 664b, and 665b) as pointing to EJBs 651, 652 in the persistent store 650. This indicates that the versions correspond to the persistent data, and that the values stored in the versions may be copied to the persistent store.

FIGS. 7 and 8 will now be described, showing how the present invention manages concurrent and/or nested transactions on EJBs by using versioning. In the discussion of these figures, the term "transaction" will be used to refer to top-level transactions as well as subtransactions and the shared transaction, unless otherwise indicated. This is because traversal of the transaction tree is being discussed, and it will be obvious from the context when top-level transactions (i.e. those with no parent other than the shared transaction) are being referenced, and when the shared transaction has been reached. (Tests as to whether a transaction has a parent include the shared transaction in this discussion, so that top-level transactions are considered as having a parent.)

For purposes of the preferred embodiment, it is assumed that the EJB will be accessed in read-only mode when no changes to an EJB are intended, and accessed in read-write mode when changes are intended. This approach optimizes the implementation of the present invention, whereby the modified flag can be set immediately to "yes" when read-write access is used, and is not set when the intent is only to read the EJB. Different access policies may be used without deviating from the inventive concepts disclosed herein. For example, it may be desired to postpone accessing the data store in write mode to a later point than what has been shown in FIG. 8 (such as moving it to immediately precede Block 835, instead of being at Block 845). It will be obvious to one of ordinary skill in the art how the processing of FIGS. 7 and 8 may be adapted to account for such changes to the access policy.

Figure 7A:
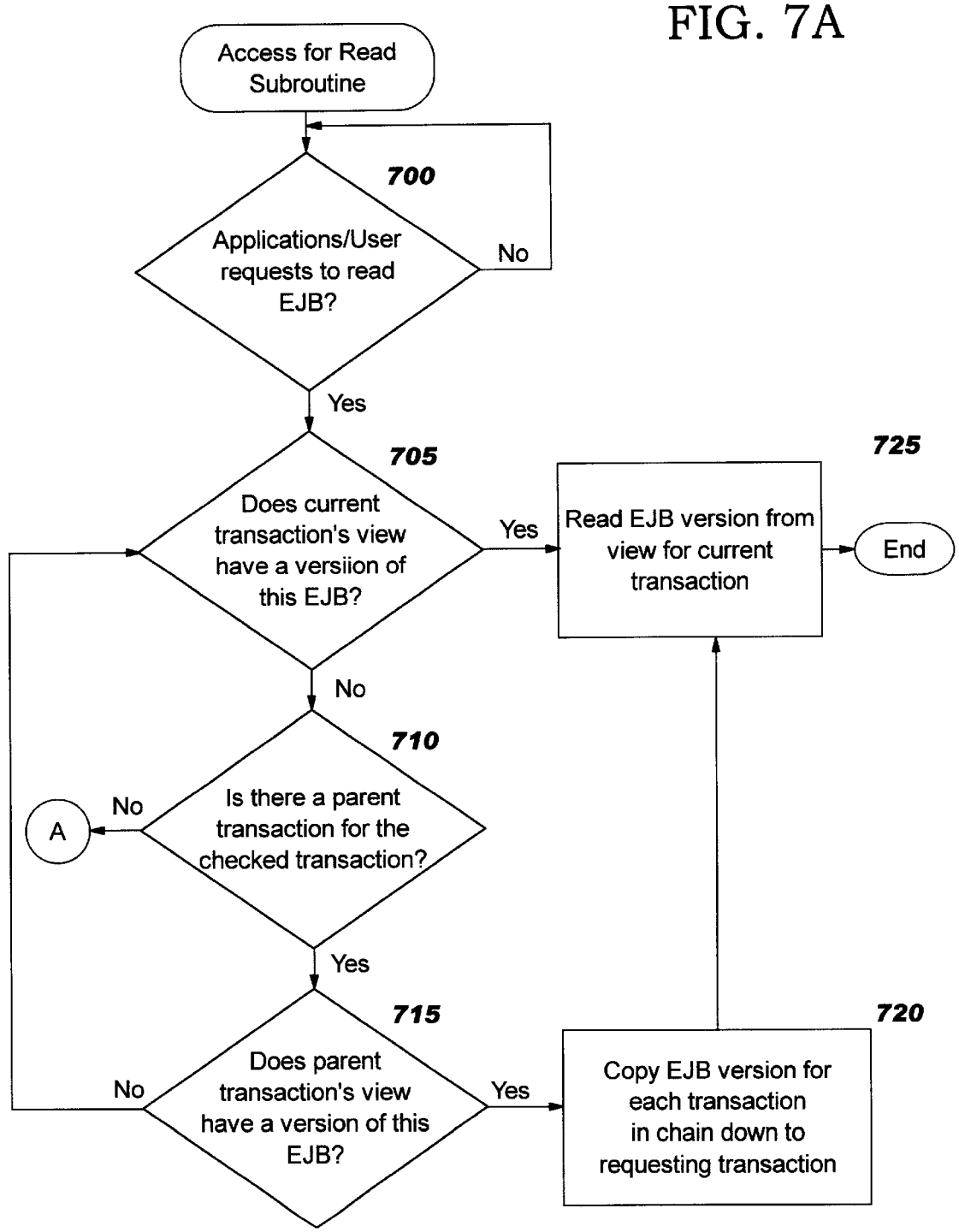
FIGS. 7A–7B provide a flowchart illustrating the process with which read access to an EJB is performed according to a preferred embodiment of the present invention.
Figure 7B:
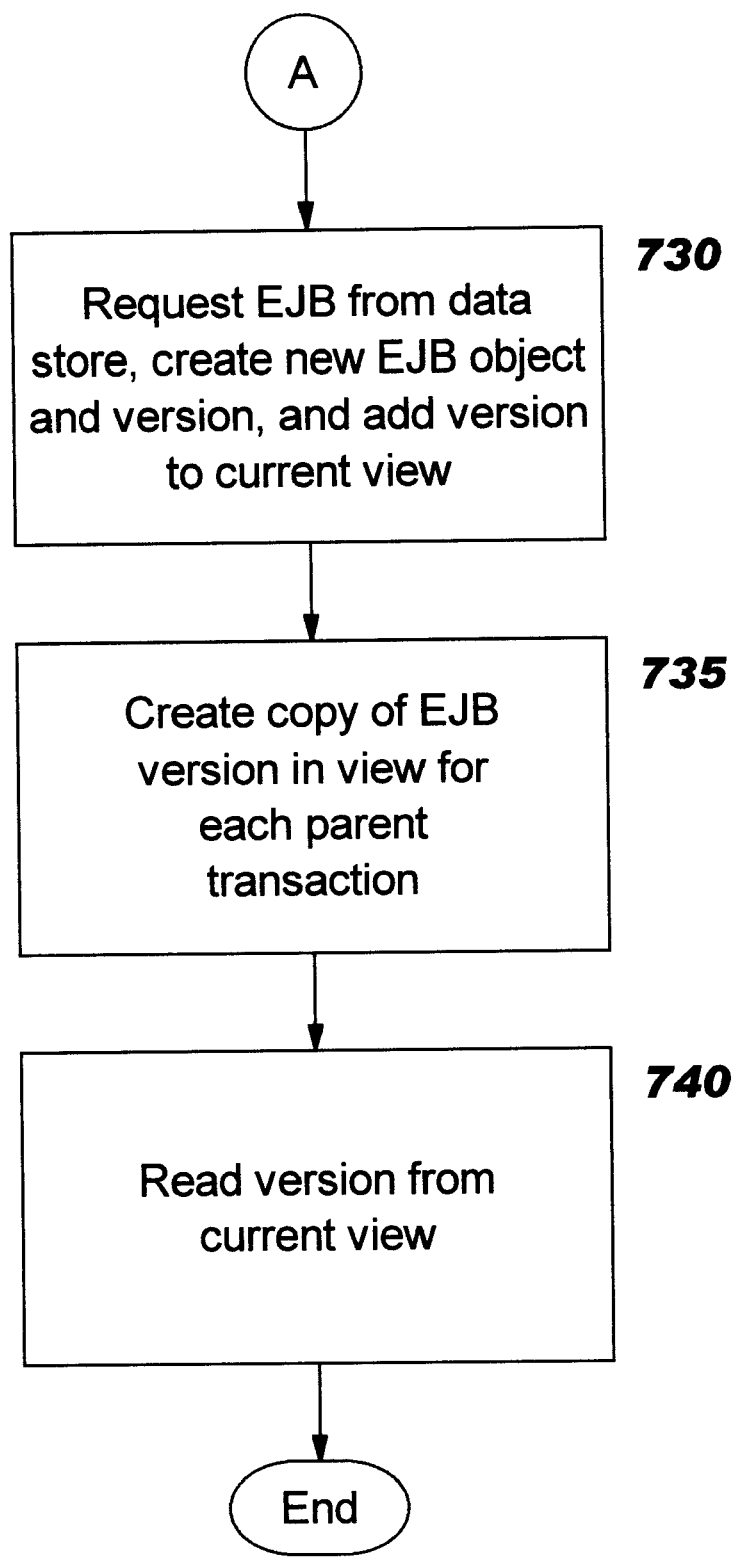

Referring now to FIGS. 7A–7B, an "access for read" event for a particular EJB will now be described. When an application or application user requests to read an EJB (Block 700), processing proceeds to Block 705, in which it is determined if the current transaction's view already has a version of the entity bean for the requested EJB. As stated above, this request is intercepted by the EJB Object within the application. The EJB Object locates the currently-active thread (by making a request of the environment, i.e. the JVM), which in the preferred embodiment has a pointer to its transaction. Using this pointer, the EJB Object is able to dynamically determine which view should be checked for this request by the current transaction. Alternative techniques for locating the current transaction may be used without deviating from the inventive concepts of the present invention. For example, a lookup table could be used, where the table index is the identifier of the current thread, and the table value is the transaction associated with that thread. An advantage of the pointer approach is that it is faster than the table lookup (and that no table maintenance is required); however, an advantage of the table lookup is that a pointer is not required to be kept in the threads. If the test in Block 705 has a positive response, processing proceeds to Block 725, in which the version is read from the view for the current transaction. Processing then ends relative to the reading of the EJB.

However, if it is found in Block 705 that a version of the entity bean for the requested EJB is not already present in the view for the current transaction, then processing proceeds to Block 710. Block 710 asks whether a parent transaction exists for the current (requesting) transaction. In many applications, such as GUI windowing applications which employ nested transactions in the form of windows which are opened within windows, a requesting transaction may be at the end of a long chain of parent transactions. In that case, there may be many parent transactions that can be checked at Block 710 before encountering a negative result. If a parent transaction is found to exist for the current transaction, processing proceeds to Block 715, in which it is determined whether a version of the requested EJB is already present in the view for this parent transaction. If so, processing proceeds to Block 720. In the case where both Blocks 710 and 715 have a positive response on the first execution, Block 720 copies the version of the requested EJB from the parent's view to the view for the current (requesting) transaction. (The case where the processing of Blocks 710 and 715 has repeated is discussed in the following paragraph.) Block 720 also copies the state value ("new" or "old") from the existing version into the version being created for the current view, and sets the modified and delete flags to "no" in this new version, as well as copying the value of the external-synchronization flag". The modification level for the child, and the modification level it remembers for its parent, are set to the current modification level from the parent. Control then transfers to Block 725, where the current transaction reads the EJB version from its view. Processing then ends relative to the reading of the EJB for the current transaction.

If it is found in Block 715 that a version of the requested EJB is not present in the view for the immediate parent for the current transaction, processing returns to Block 710, in which it is determined whether there is a parent transaction for the transaction whose view was just checked (i.e. whether there is a grandparent for the requesting transaction). If so, the view for this next transaction up the transaction chain is checked for the requested EJB, by returning again to Block 715. This progression up the transaction chain continues until either a version of the EJB is found (i.e. Block 715 has a positive result) in the view for one of the parent transactions in Block 710, or it is found in Block 710 that no further parent transactions exist.

In the former case, processing proceeds to Blocks 720 and 725, where Block 720 copies the located version to the view for the current transaction, and to the view for each node in the transaction tree between this current node and the parent where the version was found. During this copying process, the state value ("new" or "old") and the external-synchronization flag from the existing version are copied into each new version being created, and the modified and delete flags are set to "no" in each new version. The modification levels are set as described above, being copied from the parent's modification level. At Block 725, the current transaction then reads this version from its view.

In the latter case (where Block 710 has a negative result), this is an indication that a version of the requested EJB is not present in the transaction chain for the current transaction. This technique of checking for a version within the current transaction's tree is performed by the transaction management system according to the present invention to prevent an application from having two different versions of the same EJB in the same nested transaction chain, where those versions were separately retrieved from the persistent store (thus raising the potential for inconsistent results).

If Block 710 has a negative result, indicating that a version of the requested EJB does not exist anywhere in the transaction hierarchy for the current transaction, then processing proceeds to Block 730.

At Block 730, the transaction management system executes a database query (or other data store retrieval command) in accordance with known techniques to retrieve the EJB from the database or data store in which it resides. (Note that data caching could be used with the present invention, possibly avoiding the need to access the persistent store.) According to the EJB specification, the container for the EJB will create an EJB Object 510 for this application and return a version 520 of the EJB's entity Bean to the requesting application. By the versioning technique used for the present invention, it is known that this returned version of the entity Bean is the first version 520 to be used within this application. (Otherwise, it would not have been necessary to access the data store: a version of the entity bean would have been located in the processing of Blocks 705 through 725.) Thus, the transaction management system of the present invention stores the returned version of the entity Bean read from the database into the view for the current transaction. The version status data 530 for this version is set to "state=old", to indicate that the version corresponds to an EJB that is already stored in the persistent store, and sets "modified=no", "delete=no", and the external-synchronization flag to "no". The modification level for this version is set to zero.

At Block 735, the version is then copied into the view for each parent transaction up the transaction hierarchy for the current transaction, again including the shared transaction. During this copying process, the state value and modification level from the source version are copied into each new version being created, and the modified, commit, and delete flags as well as the external-synchronization flag are set to "no" in each new version.

Block 740 reads the version of the requested EJB from the current view, and read processing of the EJB ends.

Figure 8A:
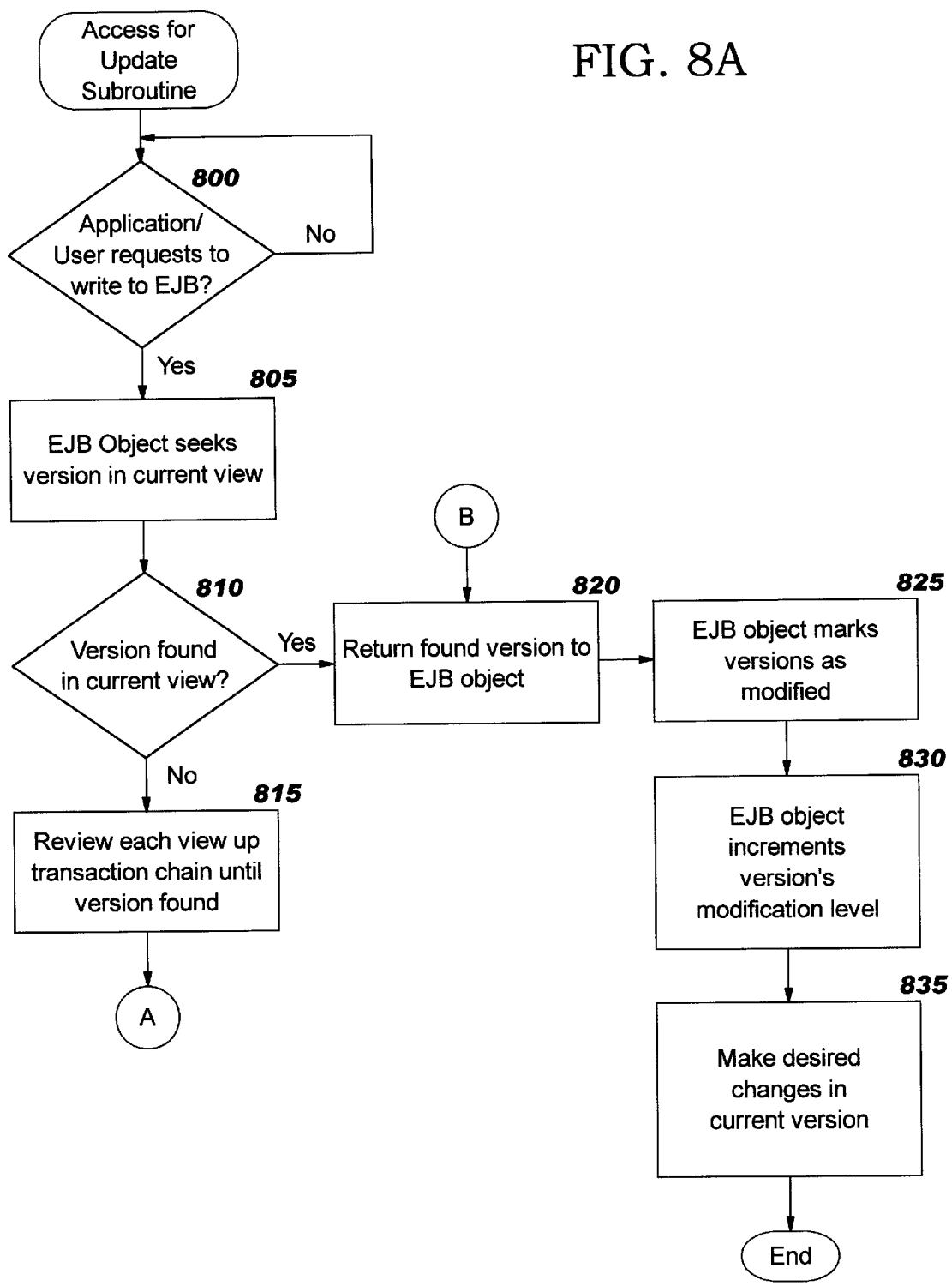
FIGS. 8A–8B provide a flowchart illustrating the process with which update access to an EJB is performed according to a preferred embodiment of the present invention.
Figure 8B:
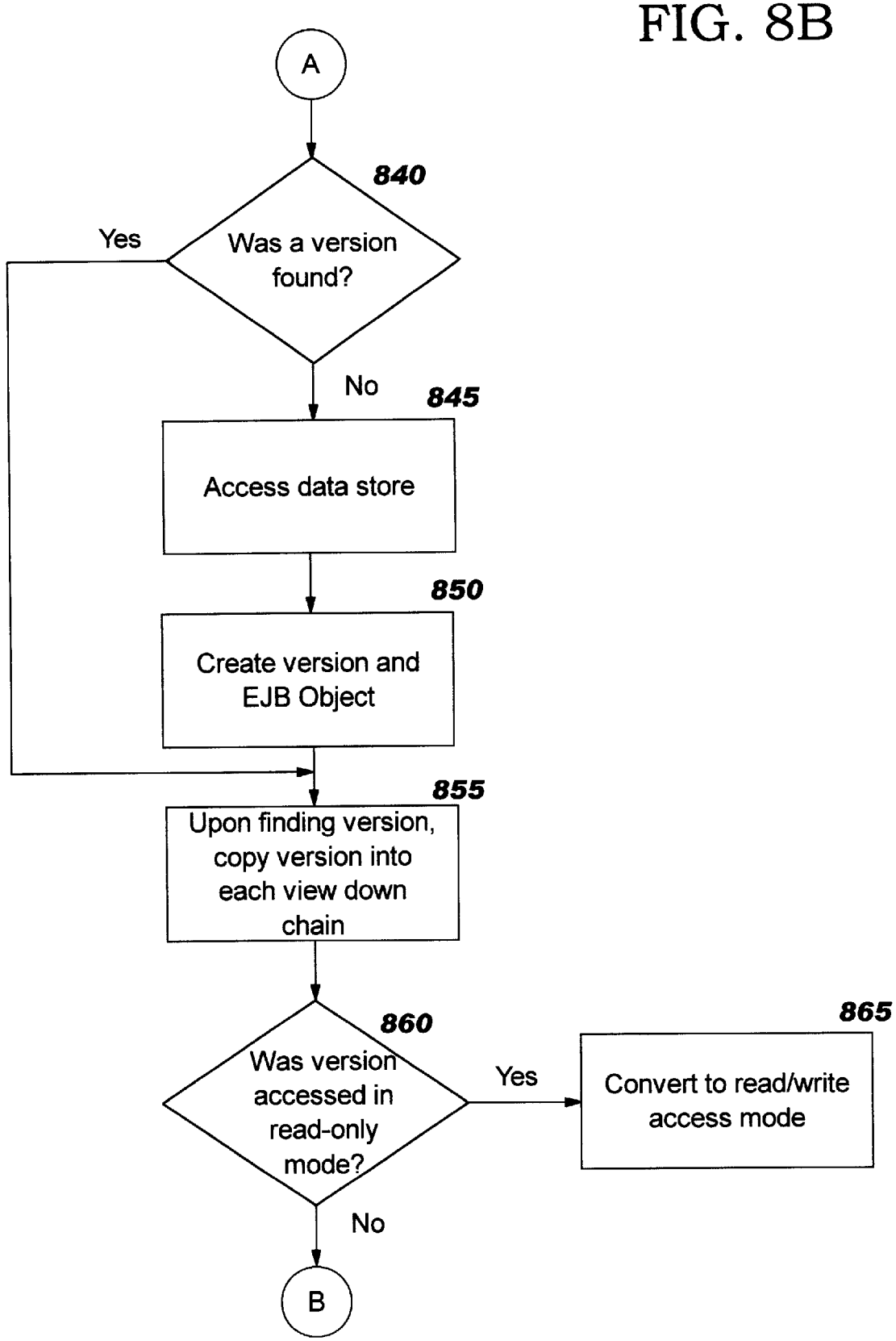
Figure 9A:
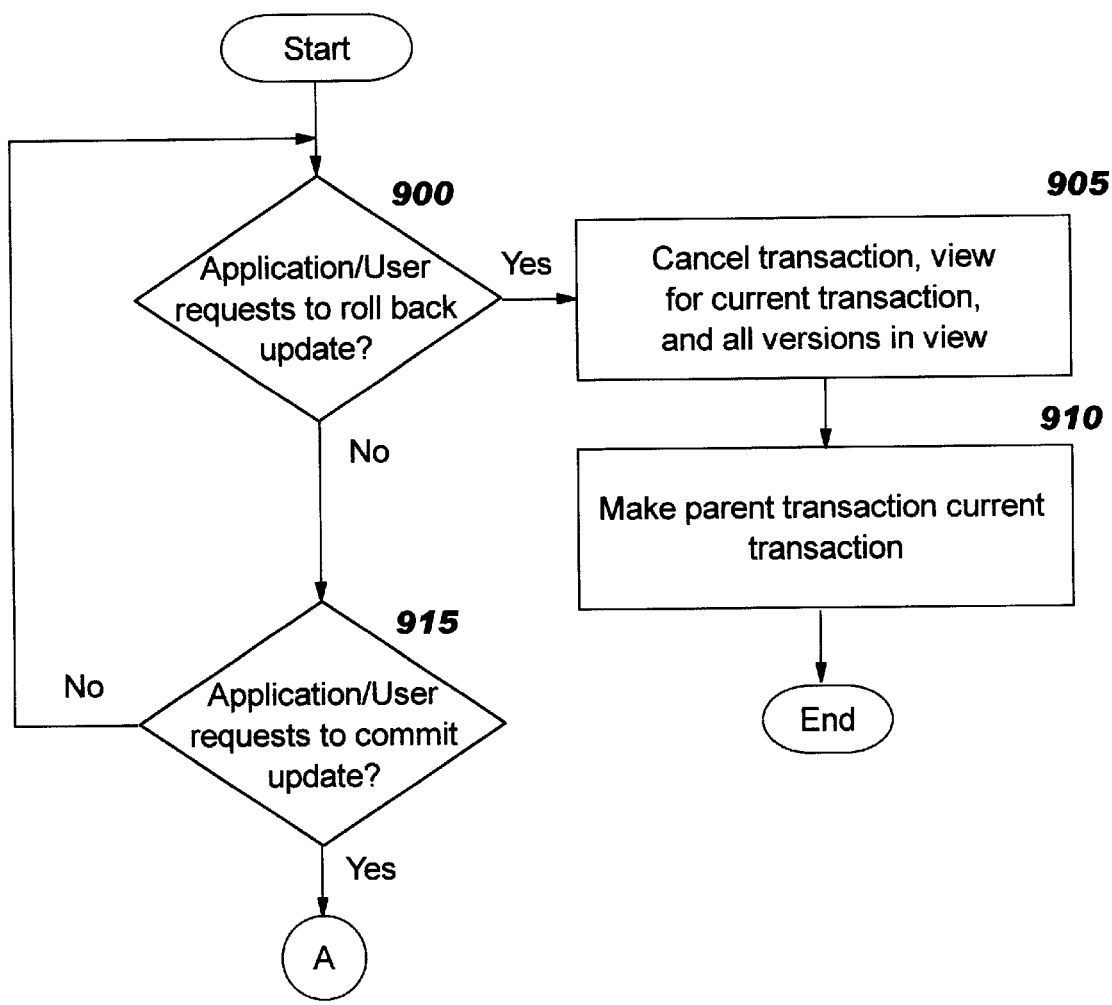
FIGS. 9A–9B provide a flowchart illustrating the process used to commit and rollback transactions according to a preferred embodiment of the present invention.
Figure 9B:
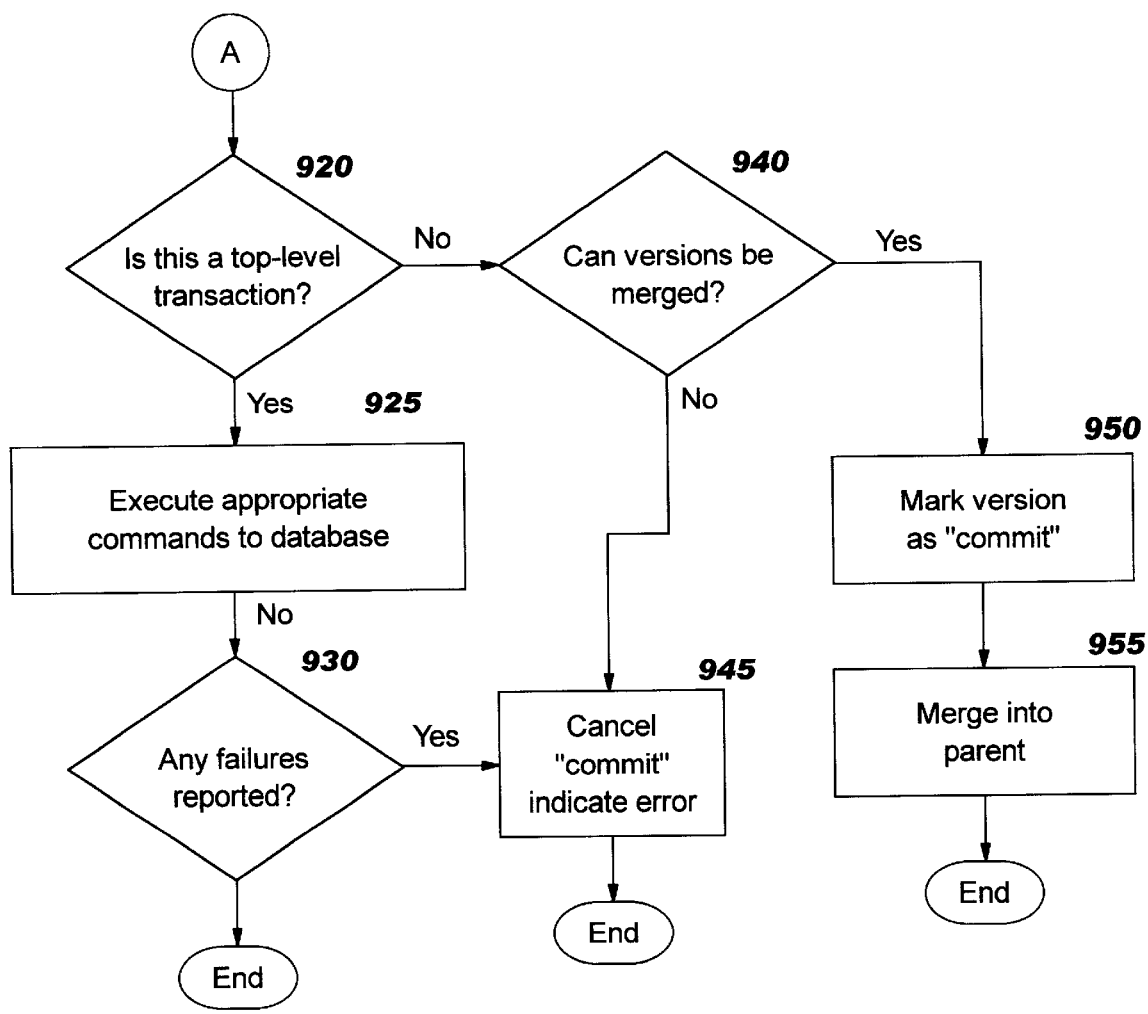

FIGS. 8A and 8B depict the update process implemented by the present invention. This technique is compatible with transaction processing monitors and data base systems of current enterprise environments, because it does not require changes to the basic operations used when committing transactions.

When it is determined that an application or application user attempts to access an EJB for update (i.e. to write to the EJB) (Block 800), the EJB Object for the EJB being accessed seeks the current version in the view for the currently-active transaction (Block 805). If a version of the entity bean for this EJB is not found in the view for the current transaction (Block 810), the processing goes up the transaction chain, checking the view for each transaction to see if a version of the entity bean can be found in the transaction chain (Block 815).

Block 840 tests whether a version was eventually found. If not, then control transfers to Block 845 to retrieve the EJB from the persistent store. (Note that a data cache may be used, as was discussed above with reference to Block 730, to reduce the likelihood of requiring an access of the persistent store.) At Block 850, a version of the entity bean and an EJB Object are created in the same manner described above for Block 765. Control then transfers to Block 855.

Block 855 is reached following a positive response in Block 840, and after the processing of Block 850. Now that a version of the entity bean is available, the entity bean version is copied to the view for each transaction down the chain, including the view for the current transaction. The version status data 530 for the version is not changed during this copying from the settings in the source version.

Following Block 855, a test is made at Block 860 to determine whether the existing version of the entity bean was accessed in read-only mode. If this test has a positive result, then control transfers to Block 865 to access the EJB again—this time in read-write mode. If the test at Block 860 has a negative result, then control continues at Block 820.

In Block 820, the found version of the entity bean is returned to the EJB Object for manipulation. The EJB Object marks the version of the entity bean as "modified= yes" (Block 825), and the EJB Object increments the modification level for this version of the entity bean (Block 830). At Block 835, the EJB Object makes the requested changes to the instance data 550 stored in the current version 520 of the entity bean. The "external-synchronization" flag is set to "yes" for this version. Update processing for this EJB then ends.

At some point, the application or application user will either decide that (1) the changes made in this transaction or subtransaction are not desired for some reason, and will request that the changes be rolled back, or (2) that the changes made in this transaction or subtransaction should be committed (i.e. saved). These two possibilities are provided for by invoking the logic of FIG. 9. (Alternatively, the logic in FIG. 9 may be broken into separate processing paths— one for commit and one for rollback—which are invoked directly in response to the corresponding request. It will be obvious to one of ordinary skill in the art how to adapt FIG. 9 for that approach.).

If it is determined in Block 900 that the changes are to be rolled back, the current transaction is cancelled, and its view and all versions of any entity beans (including but not limited to the entity bean that was just updated) are discarded (Block 905). All the subtransactions, and their views and versions, beneath this rolled back transaction in the tree are discarded. The parent of this cancelled transaction is then made to be the current transaction (Block 910), and processing relative to the rollback of this transaction or subtransaction is ended.

If it is determined in Block 915 that the changes are to be committed, processing proceeds to Block 920. In Block 920, a determination is made as to whether this is a top-level transaction. If this test has a negative result, control transfers to Block 940; otherwise, control transfers to Block 925.

At Block 925, the process of committing the changed version to the persistent store begins. For any versions having the "modified" flag set to "no", or the "delete" flag set to "yes" while the state="new", the commit process does not need to be performed. Block 925 invokes the processing of appropriate database commands to commit the changes to the database (or other persistent store, using commands appropriate for that storage facility). Block 930 then checks the result of issuing the database command(s), to determine if any failures occurred (such as a negative response to the request, sent by the data store system). If there was a failure of some sort, the commit process is cancelled at Block 945, and an error condition is returned to the application program for application-dependent processing. If there were no failures detected, then Block 930 merges the view from the top-level transaction with the view of the shared transaction by overwriting the shared transaction's version of each committed EJB with the version from the top-level transaction. The top-level transaction's version of any entity beans is then discarded, as are all the subtransactions and their versions. The changed EJB is now stored in the persistent store, and the processing for this transaction commit request ends.

Control reaches Block 940 when the transaction requesting the commit was not a top-level transaction. Therefore, this is a commit request by a subtransaction. As stated earlier, subtransaction commits are represented internally to the transaction, by merging the subtransaction's version to that of its parent. The subtransaction's changes are not actually committed to the persistent store until such time as the top-level transaction successfully commits.

It may be possible that the changes made to an entity bean by a subtransaction cannot be merged with the version of that entity bean from its parent in the transaction tree. This is called a data conflict. A merge can be successfully carried out under three conditions: (1) if only the parent version of an entity bean has been modified, (2) if only the child version of the entity bean has been modified, or (3) application-specific logic determines, in the case that both the child and parent have been modified, that a merge can be made safely, and then uses application-specific logic to perform the merge. The modification level described herein, which remembers the modification level that existed in the parent when a child version was created and increments the version's modification level for each change by the version's transaction, is one convenient way in which these conditions can be handled.

Using the modification level technique, conflict detection is implemented by comparing what the child remembers as the parent's modification level to the parent's current modification level. If the child's level is the same as what the child remembers the parent's level to be, then the child has not made changes. This is case (1) above. For this case, no merge of the child to the parent is needed, so there is no conflict. If the parent's current level is the same as what the child remembers for the parent, then the parent has not made changes. This is case (2) above. There is no conflict, and the child can be merged to the parent. If the parent's current level is higher than what the child remembered it as, and the child's version is also higher than this remembered parent level, then the parent and child have both made changes. This is case (3) above. In one aspect of the present invention, a default approach may be used for case (3), where this situation is considered a data conflict (i.e. all conflicts are considered unresolvable) and the merge will simply be rejected. In another aspect, application-specific logic is invoked for case (3) that can further analyze the versions to determine whether the modifications are compatible (i.e. whether the data conflict can be resolved), and thus will not corrupt the data stored in the persistent EJB. Application-specific logic will then be used to resolve conflicts where they are determined to be compatible, enabling the child's version to be merged into the parent's version. For example, if a child transaction made a change to zip code data in the instance data for an EJB while the parent transaction made a change to the customer phone number data in the instance data for the same EJB, application logic can determine if both represent valid values relative to the customer address also in the instance data of this EJB. For example, if the zip code belongs to an Ohio address while the area code belongs to a North Carolina telephone, there is probably a problem, and the merge would likely be rejected. However, if both the zip code and area code were valid for the same city in Ohio, the merge may be permitted.

When the subtransaction requesting the commit is a flat (leaf) transaction, then the merge checking at Block 940 is only carried out with respect to the version in the view of the subtransaction and the view of its parent. If the subtransaction is a nested (intermediate) node, then the leaves of each branch from this subtransaction are located in turn, and the commit processing of Blocks 940 through 955 is performed from each leaf upward through the tree until the requesting subtransaction is reached. If any conflicts are detected, the merge checking process will return a failure indication in the default case (and the update processing of FIG. 9 will end), or the application-specific conflict resolution process (as described above) will be invoked. When a failure is indicated (either by the default approach, or as a result of the application-specific conflict resolution processing), control will transfer to Block 945. At Block 945, the commit process is cancelled and an error is indicated.

If no failures are indicated during commit processing for all the children of the requesting subtransaction, then a merge check is performed with the parent. If the merge check with the parent node indicates a merge will succeed (including the case where application-specific logic determines that any detected conflicts can be merged using application-specific merge processing), i.e. Block 940 has a positive result, then control transfers to Block 950.

Otherwise, control transfers to Block 945, where the commit process is cancelled and an error is indicated.

Note that each version in the view is processed during the merge checking, and that the merge checking is not performed for any entity beans having the modification flag set to "no" in their version status data 530 (because no merge needs to be done when the child has not made changes to an entity bean). Further, when the "delete" flag is set to "yes" and the state is "old", this is treated as a modification so any version having this delete status is also processed during the merge check. (When the delete flag is set to "yes" and the state is "new", this indicates that an EJB created by the application has been deleted. This is analogous to cancelling the creation, and any version having these flag settings will be ignored.)

At Block 950, the requesting subtransaction's status is marked as "commit=yes". Once this commit variable has been set, no further changes can be made to the versions in this subtransaction or any of its children.

The version from the requesting subtransaction's view is then merged with the view of its parent at Block 955. This merge process comprises setting the version status data 530 in the parent to reflect the version status data of the child. If the modification level in the child version is higher than that in the parent version (as it will always be unless the application-specific conflict detection is being used), then the parent's modification level will be set to the level from the child. If the child version has the "delete" flag set to "yes", then this will be copied to the parent's version. When using the default conflict resolution technique discussed earlier, the merge process for the instance data 550 is carried out by overwriting the parent's instance data with that of the child node. When application-specific logic to detect conflicts is being used, then application-specific logic will also be used to resolve the conflicts (i.e. to determine which attributes from the child overwrite those of the parent, and which attributes in the parent remain unchanged). In an optional optimization of the preferred embodiment, the child version is not yet discarded, because the changes will not be permanently committed until the top-level transaction commits (or the changes may be rolled back, in the case where some ancestor rolls back). In this optimization, the "modified" flag and the external-synchronization flag in the child version are set to "no", indicating that the merge to the parent has completed. Processing of this subtransaction commit request is then complete from this subtransaction's perspective, and the processing of FIG. 9 ends.

The discussions of persistent store herein are in terms of using a "database". However, it is to be understood that this is for ease of reference. Any type of persistent store, however organized (such as a file system), may be used without deviating from the inventive concepts disclosed herein.

While the present invention has been described relative to managing a persistent store of EJBs using Java programming, the basic techniques described herein may be applicable to many types of object-oriented languages. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. Computer-readable media for managing Enterprise JavaBeans (EJBs) and maintaining an integrity of said EJBs in systems which permit access to said EJBs by multiple concurrent and/or nested transactions, said transactions being comprised of one or more subtransactions and said EJBs being comprised of a first instance data part, said computer-readable media embodying computer readable code comprising:

a subprocess for creating an independent version of a selected EJB in a view associated with each of a plurality of subtransactions, said version comprising a business logic part, a second instance data part, and version status data, wherein said subprocess for creating further comprises initializing said second instance data part from said first instance data part;

a subprocess for temporarily making one or more modifications to said first instance data part of said selected EJB, said modifications requested by a selected one of said subtransactions, by making said modifications to said corresponding second instance data part in said independent version in said associated view of said selected subtransaction;

a subprocess for committing said modifications upon a commit request; and a subprocess for performing a rollback of said modifications upon a rollback request.

2. Computer readable code according to claim 1, wherein said subprocess for committing further comprises:

a subprocess for use when said subtransaction is not a top-level transaction in a transaction tree, comprising:

a subprocess for attempting to merge said modifications to a parent of said subtransaction upon said request to commit said modifications;

a subprocess for cancelling said commit request if said subprocess for attempting detects one or more unresolvable data conflicts with one or more separate modifications made to said selected EJB, wherein said separate modifications are stored by said parent in one of said independent views, said one view being associated with said parent;

a subprocess for performing said merge of said modifications to said independent view associated with said parent if said subprocess for attempting does not detect any of said unresolvable data conflicts; and a subprocess for committing said merged modifications to said independent view associated with said parent; and a subprocess for use when said subtransaction is said top-level transaction in said transaction tree, comprising:

a subprocess for committing said modifications with a corresponding EJB in a persistent store;

a subprocess for merging said modifications to a global transaction if said subprocess for committing does not detect an error condition; and a subprocess for discarding said top-level transaction and any subtransactions related to said top-level transaction in said transaction tree.

3. Computer readable code according to claim 1, wherein said subprocess for committing further comprises:

a subprocess for use when said subtransaction is not a top-level transaction in a transaction tree, comprising:

a subprocess for attempting to merge said modifications to a parent of said subtransaction upon a request to commit said modifications;

a subprocess for cancelling said commit request if said subprocess for attempting detects one or more unresolvable data conflicts with one or more separate modifications made to said selected EJB, wherein said separate modifications are stored by said parent in said independent view associated with said parent;

a subprocess for performing said merge of said modifications to said independent view associated with said parent if said subprocess for attempting does not detect any of said unresolvable data conflicts; and a subprocess for committing said merged modifications to said independent view associated with said parent; and a subprocess for use when said subtransaction is said top-level transaction in said transaction tree, comprising:

a subprocess for committing said modifications with a corresponding EJB in a persistent store; and a subprocess for discarding said top-level transaction and any subtransactions related to said top-level transaction in said transaction tree.

4. Computer readable code according to claim 2, wherein said subprocess for attempting further comprises invoking application-specific logic to determine when said separate modifications indicate that one of said unresolvable data conflicts is found and said subprocess for merging further comprises invoking application-specific logic to resolve any resolvable data conflicts.

5. Computer readable code according to claim 3, wherein said subprocess for attempting further comprises invoking application-specific logic to determine when said separate modifications indicate that one of said unresolvable data conflicts is found and said subprocess for merging further comprises invoking application-specific logic to resolve any resolvable data conflicts.

6. Computer readable code according to claim 2, wherein said transaction tree represents a plurality of subtransactions in a nested transaction.

7. Computer readable code according to claim 3, wherein said transaction tree represents a plurality of subtransactions in a nested transaction.

8. A system for managing transactions in a networking environment which permits multiple transactions to access one Enterprise JavaBean (EJB) at a same time, comprising:

means for providing each of said transactions with a view which includes an independent version of said EJB which the transaction or a related transaction is working with, wherein the independent version has a business logic part, an instance data part, and a version status part, wherein said instance data part is initially copied from a corresponding part in a persistent store containing said EJB;

means for determining if an unresolvable data conflict will occur between versions of said EJB in different transactions when one of the transactions is requested to be committed;

means for canceling the commit if one or more unresolvable data conflicts will occur;

means for merging the versions of said EJB if none of said unresolvable data conflicts will occur; and means for committing the merged versions.

9. The system according to claim 8, wherein:

said determining means determines that no unresolvable data conflict will occur if one of an EJB version from a child transaction and a parent transaction which are to be merged has not been modified or where both of the EJB versions have been modified from the child transaction and the parent transaction, logic is applied that determines that the EJB versions can be successfully merged; and wherein said merging means further comprises means for invoking application-specific logic to resolve any resolvable data conflicts.

\* \* \* \* \*